Feb. 25, 1941.  R. LOZIVIT ET AL  2,233,319
BOOST CONTROL
Filed Feb. 4, 1937   9 Sheets-Sheet 1

Fig. 1

Inventors:
René Lozivit,
Johann Lichtenstein
+ Paul Xavier Auguste Gistucci,
By Jesse B. Heller, Atty.

Feb. 25, 1941.  R. LOZIVIT ET AL  2,233,319
BOOST CONTROL
Filed Feb. 4, 1937  9 Sheets-Sheet 4

Inventors:
René Lozivit,
Johann Lichtenstein
& Paul Xavier Auguste Gistucci,
By Jesse B. Heller, Atty.

Patented Feb. 25, 1941

2,233,319

UNITED STATES PATENT OFFICE 2,233,319

BOOST CONTROL

René Lozivit, Paris, Johann Lichtenstein, Levallois-Perret, and Paul Xavier Auguste Gistucci, Paris, France, assignors to Societe Generale Des Carburateurs Zenith, Geneva, Switzerland Application February 4, 1937, Serial No. 124,148
In Belgium February 11, 1936

17 Claims. (Cl. 123—75)

The present invention relates to the control of the amount of air or mixture supplied to an engine having a boost control.

An object of the invention is to eliminate the lost motion which frequently occurs in the pilot's throttle control, when the induction pressure is controlled by a boost control.

Another object of the invention is an improved boost control unit.

Another object of the invention is an improved combined control of a throttle valve by the pilot's throttle lever and by the boost control.

Another object of the invention is to provide an engine in which the maximum permissible induction pressure, as adjusted by the boost control, is varied according to the altitude.

Other objects of the invention will appear from the following description in connection with the appended drawings, wherein:

Fig. 5ª illustrates schematically, in elevation, a modification of the device illustrated in Fig. 1, including the boost control unit shown in Fig. 5.

Fig. 9 illustrates schematically, in elevation, an arrangement in which two distinct throttle valves are employed and controlled respectively by the boost control and by the pilot's lever.

In the figures, the same reference numerals are used throughout to indicate the same parts.

Figure 1:
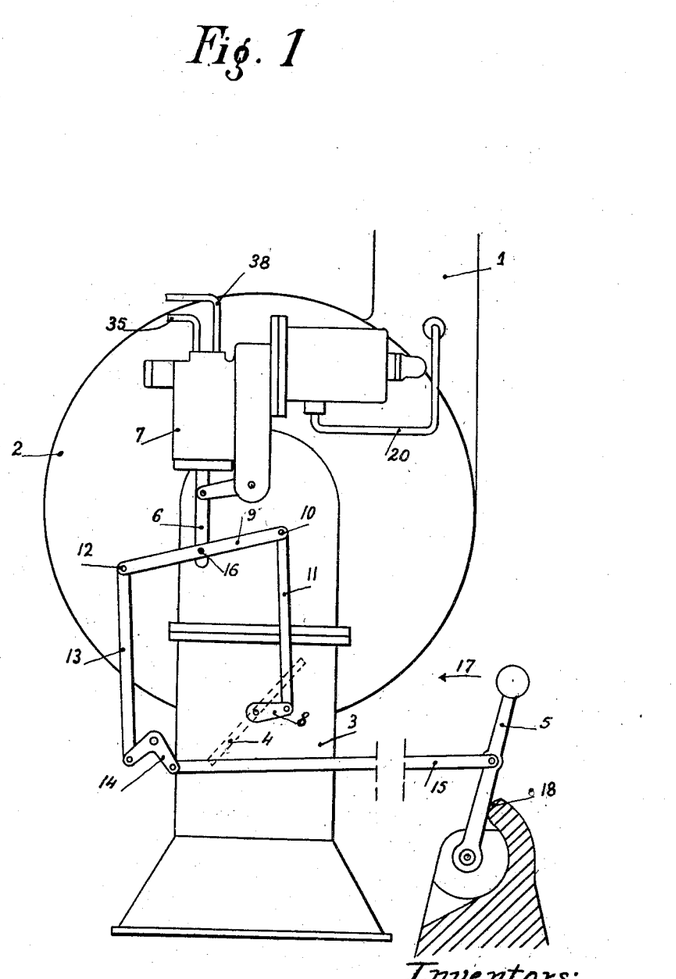
Fig. 1 illustrates schematically, in elevation, the intake manifold of an engine provided with a compressor, a carburettor and a control device according to the invention.

The device illustrated in Fig. 1 comprises a manifold 1 supplied with a combustible mixture by a compressor 2 which draws the mixture from a carburetter 3. The quantity of the mixture admitted to the engine is regulated by the throttle valve 4 of the carburetter 3. A lever 8 is mounted on throttle valve 4 at the axis thereof.

The throttle valve 4 is controlled by the combined action of a lever 5 actuated by the pilot and by the power member 6 of the relay device of a boost control indicated in its ensemble generally by the reference numeral 7. One of the ends 10 of a floating lever 9 is connected by a rod 11 to the throttle lever 8. The opposite end 12 of the floating lever 9 is connected by a rod 13, a bell crank 14 and a rod 15 to the pilot's control lever 5. An intermediate point 16 of the floating lever 9 is fastened to the power member 6 of the relay device of the boost control 7.

When the pilot moves the lever 5, the movements of this lever are transmitted to the end 12 of the free lever 9 through the rod 15 the bell crank 14 and the rod 13. The lever 9 then pivots round the fulcrum point 16 of the lever 9 and the displacements of the end 12 of the lever 9 are thus transmitted to its other end 10. The movements of the end 10 are in their turn transmitted to the throttle valve 4 through the intermediary of the rod 11 and of the throttle lever 8. Displacement of the pilot's lever 5 in the direction of the arrow 17 corresponds to a closing of the valve 4. Movements of the lever 5 in a direction to open the valve are limited by an abutment 18. In Fig. 1 the lever 5 has been illustrated in the position of maximum opening of the valve, the lever 5 being in contact with the abutment 18.

When the power member 6 of the relay device of the boost control 7 moves, its movement is transmitted to the point 16 of the floating lever 9 and moves the latter around the pivoting point 12 of the lever and the rod 13, the position of which is determined by the position of the pilot's lever 5.

Movement of the end 10 of the lever 9 due to displacement of the power member 6 is transmitted to the throttle valve 4 through the intermediary of the rod 11 and the lever 8. A displacement downwards of the power member 6 corresponds to a closing movement of the throttle valve 4.

Figure 2:
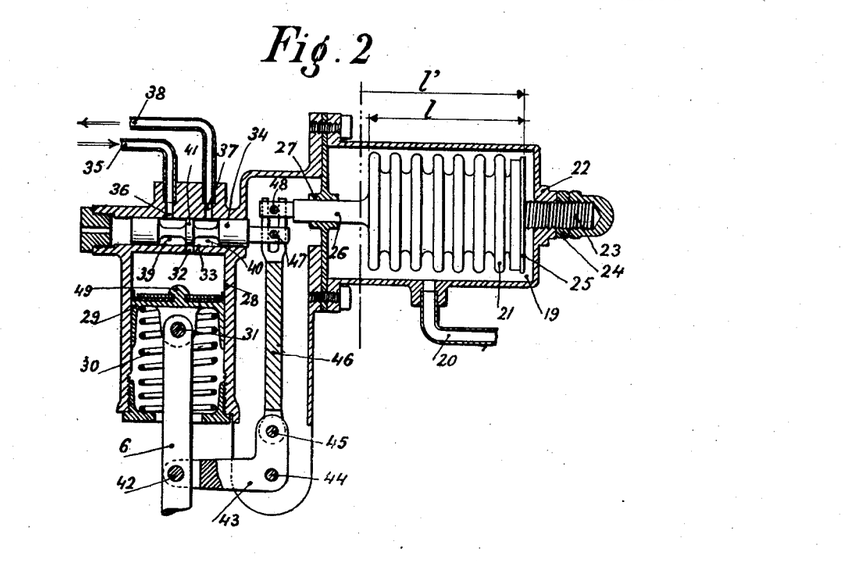
Fig. 2 illustrates schematically in longitudinal section the boost control forming part of the control device illustrated in Fig. 1.

The boost control 7, the details of which are illustrated in Fig. 2 comprises a chamber 19 which communicates by a conduit 20 with the intake manifold 1 on the delivery side of the compressor 2 (Fig. 1). The induction pressure is thus transmitted to the chamber 19. If the compressor 2 is cut out or if it is disposed on the intake side of the valve 4, the pipe 20 would have to open into the intake manifold 1 on the delivery side of the said valve 4.

The chamber 19 contains a manometric element constituted by a closed extensible element 21 fixed at the end 22 of the chamber 19 by a screwed spindle 23 carried by the end 25 of the element 21 and fixed by means of a lock nut 24. The spindle 23 permits the initial adjustment of the position of the element 21 in the chamber 19. At the end opposite to the spindle 23 the element 21 carries a spindle 26 passing through a guide 27.

The relay device of the boost control 7 comprises a cylinder 28 in which moves a power piston 29 loaded by a spring 30. The power member of the relay device is constituted by a rod 6 pivoted to the pin 31 carried by the base of the power piston 29. The cylinder 28 communicates by means of an orifice 32 with a cylindrical bore 33, in which slides a plunger 34 constituting a pilot member for the relay device. The cylindrical bore 33 communicates through a passage 36, with a pipe 35 which is connected in the circuit of the lubricating oil pressure system of the engine, and it communicates by a passage 37 with a pipe 38 for returning the oil.

The plunger 34 has two channels 39 and 40 which communicate respectively with the passage 36 receiving oil under pressure and the discharge passage 37. The size of these channels is such that these passages are never covered. The part 41 of the plunger situated between the two channels 39 and 40 is capable of partly covering the orifice 32. In Fig. 2 the plunger has been illustrated in the neutral position. In this position, the orifice 32 projects on both sides of the part 41 of the plunger 34, so that the cylinder 28 communicates with the channel 39 and the oil passage 36 under pressure on the one hand, and with the channel 40 and the discharge passage 37 on the other hand. The pressure which exists in the cylinder 28 is intermediate between the oil pressure existing in the channel 39 and the low pressure (discharge pressure) existing in the channel 40, and it depends on the relative section of the passages existing on either side of the part 41 of the plunger 34. When the plunger 34 occupies the neutral position, the pressure in the cylinder 28 which acts on the upper face of the piston 29 balances the force of the spring 30. If the plunger 34 moves to the right, the pressure in the cylinder 28 increases and becomes stronger than the spring 30. The oil under pressure coming from the passage 36 and penetrating the cylinder 28 through the channel 39 and the orifice 32 then forces the pistons 29 and thereby the power element 6 of the relay device downwards. If, on the contrary, the plunger 34 moves to the left from the neutral position, the pressure in the cylinder 28 decreases and the force of the spring 30 preponderates and pushes the piston 29 and the power element 6 up again driving the oil contained in the cylinder 28 through the orifice 32, the channel 40 and the discharge passage 37.

A lever 43 pivots round a pin 44 carried by the body of the apparatus. One of the arms of the lever 43 carries a pin 45 on which is mounted a lever 46 which ends in a fork. The plunger 34 and the end 26 of the element 21 respectively carry studs 47, 48 which engage between the arms of the fork 46. The lever 43 and the fork 46 constitute a device for varying the datum of the boost control. For a predetermined position of the lever 43 such as that indicated in Fig. 2, the pilot plunger 34 occupies the neutral position for a certain length $l$ of the element 21, that is to say, for a certain value of the induction pressure to which the element 21 is subjected. This particular value of the induction pressure is the rated induction pressure which corresponds to said predetermined position of the lever 43. If the lever 43 moves through a certain angle around the pin 44, for example in clockwise direction, the element 21 must take up a length of $l'$ in order that the pilot plunger 34 may still occupy the neutral position. This length $l'$ corresponds to a different value of the rated induction pressure and to each determined position of the lever 43 corresponds a determined length of the element 21 and a determined value of the datum of the boost control.

The connection between the power member of the relay device and the device for varying the datum of the boost control consists of a pin 42 which connects the power member 6 to one of the arms of the lever 43. Owing to this connection, the datum of the boost control is a function of the position of the power member 6.

The operation of the device is as follows:

If it is assumed that the engine operates at a predetermined altitude, the lever 5 of the pilot being placed in a position of maximum aperture, the various members occupy a position of equilibrium as long as the conditions of the running of the engine do not vary. This position is illustrated in Figs. 1 and 2; the pilot plunger 34 occupies the neutral position, the induction pressure is equal to the rated induction pressure corresponding to the particular position occupied by the lever 43, and the element 21 has a length $l$.

If the pilot moves the lever 5 in the direction of the arrow 17, this movement is transmitted to the throttle valve 4, through the rod 15, the bell crank 14, the rod 13, the lever 9 pivoting round the axle 16, the rod 11 and the throttle lever 8, and brings about a closure movement of the throttle valve 4. The closure of the throttle valve 4 bring about a lowering of the induction pressure, and the element 21, which is exposed to such pressure, lengthens. The spindle 26 of the element 21 moves towards the left and takes with it the fork 46 which pivots around the pin 45. The fork 46 takes with it in its movement the stud 47 and the plunger 34 which is thus displaced towards the left, from the neutral position. The relay device is put into action and the spring 30 pushes the power piston 29 upwards, driving the oil contained in the cylinder 28 through the discharge passage 37. While moving upwards the piston 29 takes with it the power member 6, the movement of which is transmitted to the throttle valve 4 through the lever 9 which pivots round the axle 12, through the rod 11 and the valve lever 8, and the valve 4 opens again. In its upward movement, the power member 6 takes with it the lever 43 through the intermediary of the pin 42, while the re-opening of the valve 4 produces an increase in the induction pressure which is expressed in the shortening of the element 21.

The movement of the lever 43 and the shortening of the element 21 have the effect of bringing back the pilot plunger 34 towards the right, that is to say, towards its neutral position. This neutral position is attained when the piston 29 has traversed a certain distance and when the element 21 has a length $l'$ greater than the initial length $l$. The corresponding induction pressure is equal to the rated pressure which corresponds to the new position of the power member 6 and which is weaker than the initial rated pressure. This new rated pressure is obtained for a throttle opening which is smaller than the initial opening. The plunger 34 then occupies the neutral position, the relay device is out of action, the power piston 29 is immobilised, and the system is again in equilibrium. It is thus seen that the moving of the lever 5 in the direction of the closing of the throttle valve has as a result a closure movement of the said valve, followed by a partial reopening; but the final position at which the throttle valve 4 is stabilised corresponds to a smaller opening than the initial opening so that the moving of the lever 5 has finally had, as a result, an effective closing of the valve 4.

If the pilot displaces the lever 5 more and more in a direction to close valve 4, the power member 6 of the relay device is moved upwards more and more and the valve 4 is closed more and more, while the induction pressure diminishes. For a definite position of the lever 5, the button 49 carried by the piston 29 abuts against the upper end of the cylinder 28. If the pilot moves the lever 5 in the direction of closure of the valve 4 beyond this position, the power piston 29, which has reached the end of its stroke is no longer capable of intervening to bring about a partial re-opening of the throttle valve although the induction pressure decreases below the rated pressure, so that the throttle valve is found to be controlled solely by the lever 5.

It must be noted that the valve 4 reaches its position of closure (slow-running position) for a position of the lever 5 which is always the same whatever the altitude, since the power piston 29 is always at the end of its course, that is to say, it occupies an invariable position, when the slow-running position has been reached.

When the engine is operating at ground level the lever 5 being placed in its position of maximum opening, that is to say, in contact with the abutment 18, the power piston 29 and the power member 6 occupy a definite position, the throttle valve 4 being partially closed, and the motor develops the maximum power allowed. If the engine rises to a height, the lever 5 being always maintained in the position of maximum opening, the power piston 29 rises in the cylinder 28 taking with it the power member 6. In the course of this displacement it opens the throttle valve 4 more and more while it diminishes progressively the datum of the boost control. The induction pressure which remains constantly equal to the rated induction pressure at each instant, itself diminishes. When the height reaches the rated height, the power piston 29 abuts against the upper end of the cylinder 28 and the throttle valve 4 then attains complete opening. It has been pointed out that this decrease in the maximum induction pressure, when the altitude increases, is one advantage of the invention, because it is desirable that the engine should develop at ground level a power slightly superior to the power which it is capable of developing at a height.

The difference between the maximum induction pressure on the ground and the maximum induction pressure at the rated height depends on the determination of the device for varying the datum of the boost control, and depends in particular on the ratio of the lengths of the arms of the lever 43 and the respective distances between the studs 47 and 48 and the pin 45. For example, these various lengths will be determined in such a way that the maximum induction pressure allowed (rated induction pressure for the maximum opening-position of the lever 5) should be equal to 1,000 gr./cm.$^2$ on the ground and 900 gr./cm.$^2$ at the rated height. In these conditions, the difference between the maximum power which the engine is capable of developing on the ground and at the rated height for a definite regime will be of the order of 10%. A modification of these various lengths will make it possible to alter this difference in power as desired.

Figure 3:
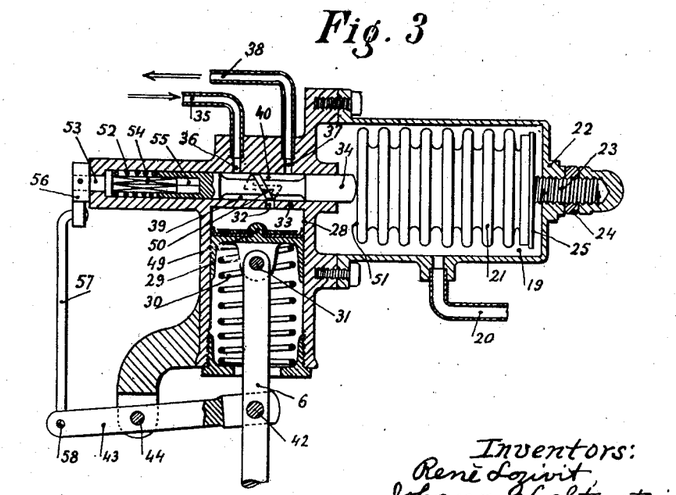
Figs. 3 to 5 illustrate schematically, in longitudinal section, modifications of the boost control illustrated in Fig. 2.

The boost control illustrated in Fig. 3 differs from the boost control illustrated in Fig. 2 in the form of construction of the device varying the datum of the boost control. In the device illustrated in Fig. 3 the central portion 50 of the pilot plunger 34 is formed helicoidal. The plunger 34 is capable of being turned in the cylindrical bore 33, and it is kept pressed against the face 51 of the element 21 by a spring 52.

A shaft 53 extending through the end of the cylindrical seat 33 has an end of square section 54 which engages in a seat of the same form 55 in the pilot plunger 34. The shaft 53 therefore carried with it in its rotary movement the pilot plunger 34, while allowing the plunger to move freely in a longitudinal direction. The rotation of the shaft 53 is obtained by means of a lever 56 mounted on the end of the shaft and connected by a rod 57 to the end 58 of the lever 43. The lever 43 pivots round the pin 44 carried by the body of the apparatus, and its opposite end is connected by a pin 42 to the power member 6 of the relay device. The combination of lever 43, rod 57, lever 56 and shaft 53 provided with an end 54, constitutes the device for varying the datum of the boost control.

If the power member 6 moves upwards, it brings about a rotation of the pilot plunger 34 through the intermediary of the lever 43, the rod 57 and the shaft 53 having the squared end 54. Owing to the helicoidal form of the central portion 50 of the plunger 34, the central portion is no longer opposite the orifice 32, that is to say, the plunger is no longer in the inoperative position. To bring back the plunger to the inoperative position it is necessary that the element should lengthen by a definite amount. The movement of the power element 6 in the direction of the opening of the valve thus increases the length of the manometric element 21 which corresponds to the inoperative position of the pilot member 34, as in the device illustrated in Fig. 2. The operation of the device illustrated in Fig. 3 is absolutely analogous to the operation of the device illustrated in Fig. 2.

In the device illustrated in Fig. 3, the element 21 could inversely control the rotation of the plunger 34, while the power member 6 could control its longitudinal movements.

Figure 4:
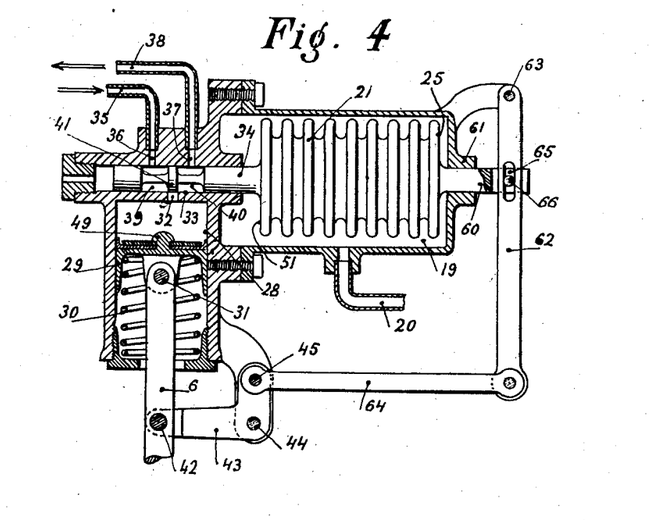

In the device illustrated in Fig. 4 the pilot plunger 34 is carried by the end 51 of the element 21. The opposite end 25 of the element 21 carries a spindle 60 passing through a bearing 61. A lever 62 pivoted at 63 is connected by a rod 64 to one of the arms of the lever 43, which latter is itself connected by the pin 42 to the power member 6 of the relay device. The lever 62 is provided with a slot 65 in which is engaged a pin 66 carried by the spindle 60 of the element 21. The combination of the lever 43, the rod 64, the lever 62 and the spindle 60 constitutes the device for varying the datum of the boost control.

The pilot plunger 34 being integral with one of the ends 51 of the element 21, the position of the end 51 which corresponds to the inoperative position of the pilot plunger 34 is invariable and independent of the position of the power member 6. When the power member 6 is moved upwards it takes with it the device for varying the datum of the boost control and moves the element 21 to the right through the intermediary of the lever 43, the rod 64, the lever 62 and the spindle 60. In order that the pilot plunger 34 may again occupy the inoperative position after such a movement, it is necessary that the element 21 should lengthen by a certain or definite amount, in order that its end 51 should take up the invariable position again which corresponds to the inoperative position of the pilot plunger 34. It can be seen that, in the arrangement illustrated in Fig. 4 as in the arrangement illustrated in the Figs. 2 and 3, a movement of the power member 6 of the relay device in the direction of opening the throttle valve increases the length of the manometric element which corresponds to the inoperative position of the pilot member, and the operation of the device illustrated in Fig. 4 is completely analogous to the operation of the devices illustrated by Figs. 2 and 3.

Figure 5:
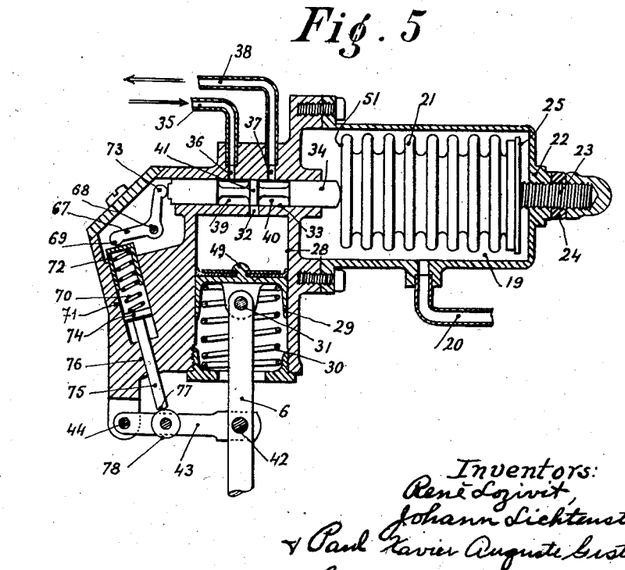

In the device illustrated in Fig. 5 the end 25 of the element 21 is fixed in the end 23 of the chamber 19 in the same way as the device illustrated in Fig. 2. A lever 67 pivotal about a pin 68 has one end 69 thereof loaded by a spring 70 which is disposed in a housing 71 made in the body of the apparatus. A hollow piston 72 sliding in the cylindrical housing 71 is interposed between the spring 70 and the end 69 of the lever 67. The opposite end 73 of the lever 67 bears against one end of the pilot plunger 34 by the force of the spring 70. The force of this spring, moreover, maintains the opposite end of the pilot plunger 34, in contact with the face 51 of the element 21. The spring 70 is compressed between the hollow piston 72 and the head 74 of the spindle 75 sliding in a guide channel 76. The end 77 of the spindle 75, is maintained in contact, by means of the spring 70, with a roller 78 carried by the lever 43. The lever 43 pivots about a pin 44 carried by the body of the apparatus and is connected to the power member 6 of the relay device by a pin 42. The combination of the lever 43 and the spindle 75 constitutes the device for varying the datum of the boost control.

The force of the spring is transmitted to the end 51 of the element 21 through the intermediary of the hollow piston 72, the lever 67 and the pilot plunger 34. For a determined value of the induction pressure transmitted to the chamber 19 the element 21 assumes such a length that its own elastic resistance, possibly increased by any elastic means disposed inside this element, balances the induction pressure to which the element is subjected, externally assisted by the force of the spring 70.

When the pilot plunger 34 occupies the inoperative position, the position of the end 51 of the element 21 is invariable and, as the opposite end 25 of the element 21 is fixed, the length of the element which corresponds to the inoperative position of the pilot plunger 34 is invariable. If the power member 6 moves upwards, it takes with it the lever 43 and compresses the spring 70 through the intermediary of the roller 78 and the spindle 75. The force which the spring exerts on the element through the intermediary of the hollow piston 72, the lever 67 and the pilot plunger 34, increases, which brings about a shortening of the element. In order that the element may recover its initial length and the pilot plunger be brought back to its inoperative position, the induction pressure must be lowered to such an extent that the decrease in this pressure, which acts on the element, balances the increase in the thrust of the spring. It can thus be seen that a movement of the power member in a direction to open the throttle valve brings about a decrease in the rated induction pressure.

The operation of the device illustrated in Fig. 5 is analogous to the operation of the devices illustrated in the preceding figures. The control lever 5 of the pilot being placed in a position of maximum throttle opening, the power piston 29 and the power member 6 occupy a basic position if the conditions of the running of the motor are stable and if the altitude does not vary. The pilot plunger 34 occupies the inoperative position. If the pilot moves the lever 5 in a direction to close the throttle valve, the movement brings about first of all a partial closure of the said valve. The induction pressure decreases and, consequently, the element 21 lengthens, displacing the pilot plunger 34 from its inoperative position. The relay device is put into action, and the piston 29 of the power member 6 is displaced upwards. The lever 43 is actuated and movement is transmitted to the spindle 75 by the roller 78. This movement of the spindle 75 has the effect of increasing the compression of the spring 70. The movement of the power member 6 brings about a partial re-opening of the throttle valve 4. The partial re-opening as well as the increase in the compression of the spring 70, both have the effect of reducing the length of the element 21. The element 21 again takes up its initial length, for which the pilot plunger 34 occupies the inoperative position, for a value of induction pressure smaller than the initial value, since the compression of the spring 70 is greater than the initial compression. This new value of the induction pressure is attained by an opening of the throttle valve 4 which is smaller than the initial opening, so that moving the lever 5 in a direction to close actually has for a result the closing of the throttle valve 4.

Figure 6:
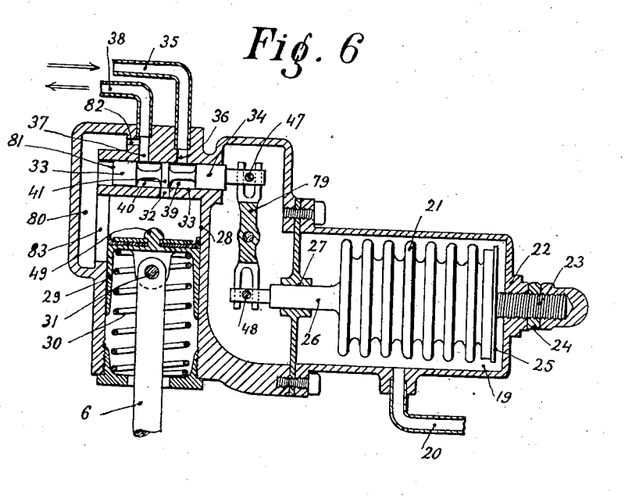
Fig. 6 illustrates schematically, in longitudinal section, a further modification of the boost control shown in Fig. 2.

In the device illustrated in Fig. 6, as in the device illustrated in Fig. 5, the device for varying the datum of the boost control actuated by the power member of the relay device works by means of a modification of the intensity of a force loading the manometric element, but instead of regulating the force of a spring, the device regulates the pressure of a fluid.

In the device illustrated in Fig. 6 the element 21 is connected to the pilot plunger 34 by a lever 79. The cylindrical bore 33, in which the pilot plunger 34 slides, communicates with a chamber 80 containing oil, and the end 81 of the plunger 34 is subjected to the oil pressure in the chamber 80. The chamber 80 communicates on the one hand with the discharge passage 37 through a calibrated orifice 82, and on the other hand with the cylinder 28 by a longitudinal slot 83. The longitudinal slot 83 is partially covered by the piston 29, and the length of the slot 83 uncovered varies as a function of the position of the power piston 29, which thus regulates the section of the passage between the cylinder 28 and the chamber 80. As long as the piston 29 has not reached one of the ends of its course, the pressure of the oil in the cylinder 28 is well determined, since it balances the force of the spring 30. The pressure in the discharge passage 37 is practically equal to atmospheric pressure. The pressure in the chamber 80 is intermediary between the pressure existing in the cylinder 28 and the pressure existing in the discharge passage 37, and the value of the pressure in the chamber 80 depends on the ratio between the section of the fixed calibrated orifice 82 and the section of the uncovered part of the slot 83.

The pressure in the chamber 80 diminishes as the uncovered section of the slot 83 diminishes, that is to say, as the power piston 29 moves upwards (direction to open the throttle valve). The combination of chamber 80, calibrated orifice 82 and slot 83 the uncovered portion of which is controlled by the piston 29, constitutes the device for varying the datum of the boost control.

The variations in pressure which the oil contained in the chamber 80 exerts on the end 81 of the pilot plunger 34, when the power piston 29 is displaced, plays the same role as the variations in the force of the spring 70 (Fig. 5) so that the operation of the device illustrated in Fig. 6 is analagous to the operation of the device illustrated in Fig. 5. It will be noticed, however, that owing to the presence of the lever 79 in the device illustrated in Fig. 6 the movement of the pilot plunger 34 to the right in this device corresponds to the movement of the plunger towards the left in the device illustrated in Fig. 5 and inversely. It is obvious that the plunger 34 must be given a suitable section in order that the thrust exerted by the oil in the chamber 80 on the end 81 of the plunger 34 has a suitable value. Further, the slot 83 could be replaced by a series of orifices provided in the wall separating the cylinder 28 and the chamber 80 and disposed at different levels.

Figure 7:
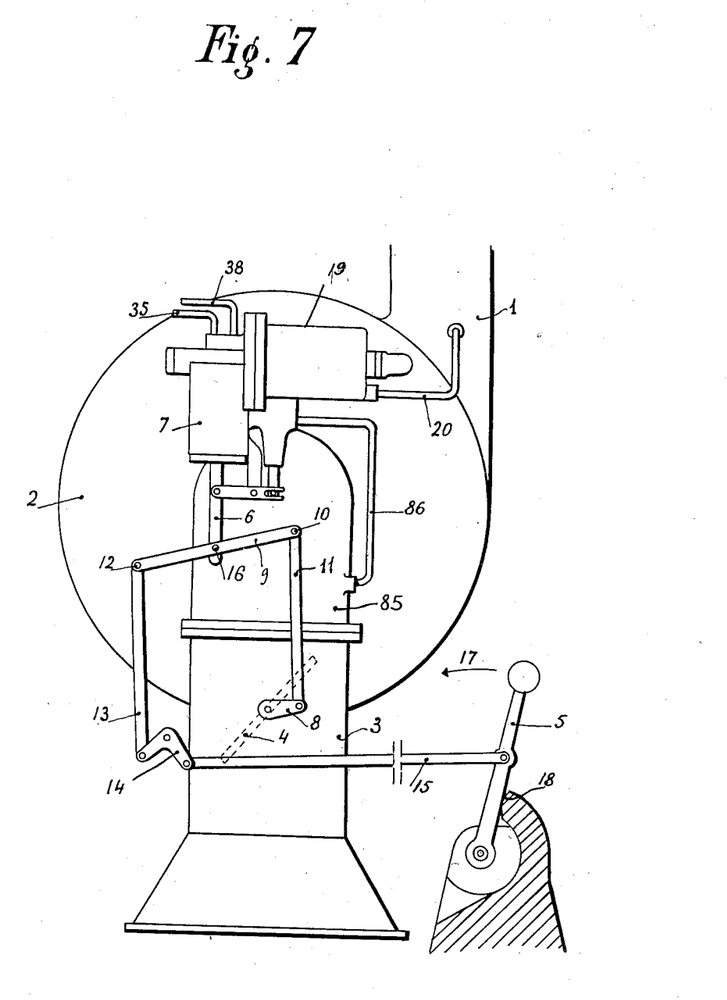
Fig. 7 illustrates schematically, in elevation, a further modification of the device illustrated in Fig. 1.
Figure 8:
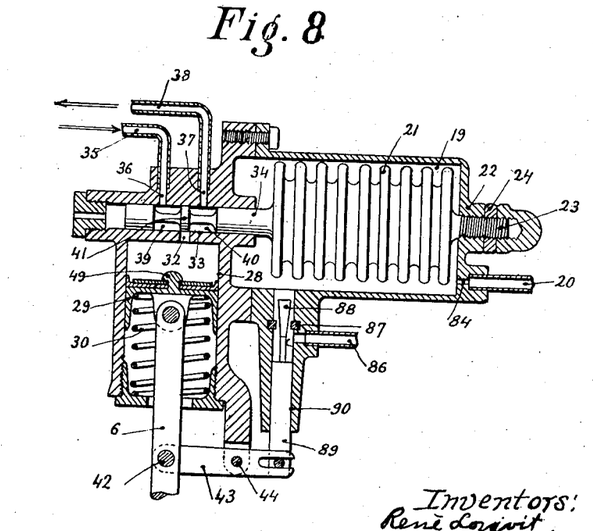
Fig. 8 illustrates schematically, in longitudinal section the boost control of the device illustrated in Fig. 7.

The device illustrated in Figs. 7 and 8 can only be applied to engines provided with a compressor disposed on the discharge side of the throttle valve. In this device the chamber 19 containing the element 21 communicates on the one hand with the intake manifold 1 on the discharge side of the compressor 2 by a passage 20 in which is disposed a calibrated orifice 84, and on the other hand with a portion 85 of the intake manifold situated between the valve 4 and the compressor 2 by a conduit 86. In this conduit 86 is disposed a calibrated orifice 87 the section of which is regulated by a profiled spindle 88 which is an extension of a shaft 89 which passes through a guide 90, and it is attached to the power member 6 of the relay device by the lever 43 pivoting about a pin 44. The power member 6 thus controls the profiled spindle 88 which controls the passage section of the orifice 87. The profile of the spindle 88 is such that this passage section diminishes as the power member 6 moves upwards, that is to say, in the direction to opening of the throttle valve 4.

Whereas, in all the forms of construction which have been described above, the pressure in the chamber 19 is equal to the induction pressure, the pressure in the chamber 19 in the device illustrated in the Figs. 7 and 8, is intermediate between the induction pressure (pressure posterior to the compressor) and the pressure at the entrance to the compressor.

The operation of the device is as follows.

The control lever 5 of the pilot being placed in the position of maximum throttle opening, the power piston 29 and the power member 6 occupy a basic position if the conditions of running of the engine are stable and if the altitude does not vary. The pilot plunger 34 occupies the inoperative position, and the passage section of the orifice 87 is determined by the particular position occupied by the power member 6. The induction pressure is equal to the rated induction pressure which corresponds to the particular position of the power member 6. The pressure in the chamber 19 is intermediate between the pressure existing anterior to the compressor 2 at 85 and the rated induction pressure, and its value is determined by the position of the profiled spindle 88.

If the pilot moves the lever 5 in a direction to close, the movement brings about first of all a partial closure of the valve 4. There results a lowering of the pressures which exist above and below the compressor 2 and, consequently, a lowering of the pressure existing in the chamber 19. The element 21 lengthens and displaces the pilot plunger 34 towards the left from its inoperative position. The power piston 29 and the power member 6 move upwards, under the influence of the thrust of the spring 30, driving out the oil contained in the cylinder 28. In this movement, the power member 6 takes with it the throttle valve 4 in a direction to open. At the same time it takes with it the profiled spindle 88 through the intermediary of the lever 43, and the passage section of the orifice 87 diminishes.

The opening movement of the throttle valve 4 and the decrease in the passage section of the orifice 87 both have the effect of increasing the pressure existing in the chamber 19. The element 21 shortens and brings back the pilot plunger towards the inoperative position. The inoperative position is attained when the pressure in the chamber 19 has the value which it had initially, but, as the orifice 87 has then a smaller passage section than the initial passage section, this position is attained for an opening of the throttle valve 4 smaller than the initial opening and for a value of the rated induction pressure smaller than the initial rated induction pressure. The movement of the lever 5 in the direction of the closure of the throttle valve will therefore have had as a final result an actual closure of the valve 4.

It is clear that the profiled spindle 88 could regulate the passage section of the orifice 84, instead of regulating the passage section of the orifice 87, since it is only the ratio between the passage sections which is of importance, and not their absolute value.

Figures 5A, 9:
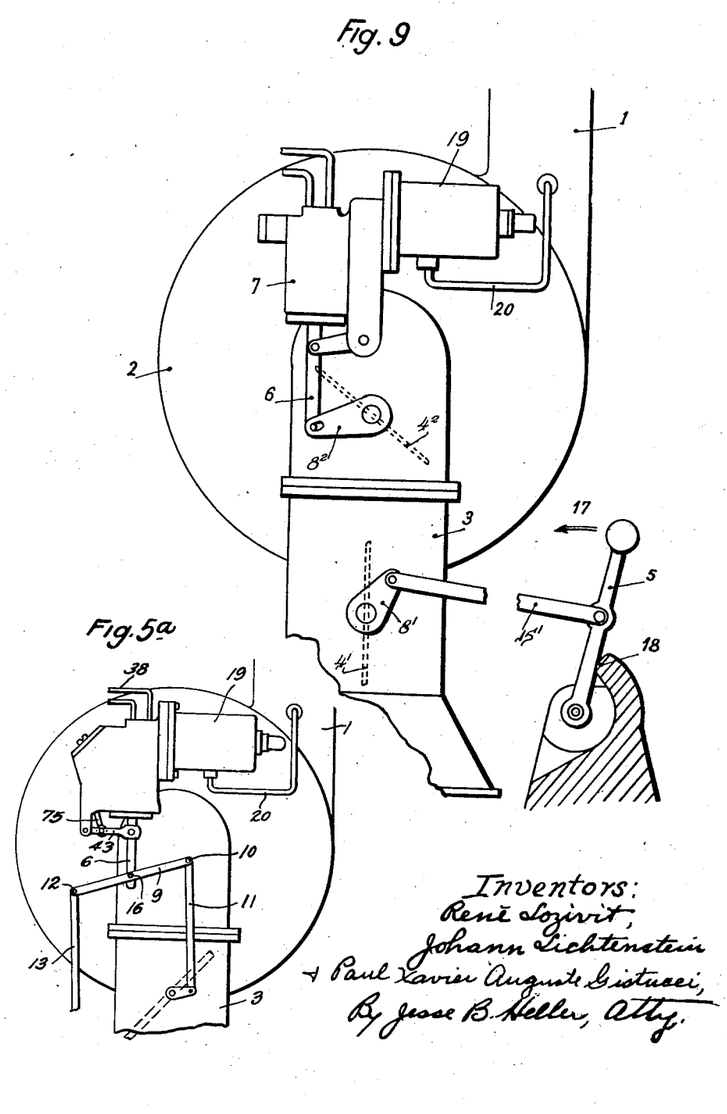

The device illustrated in Fig. 9 comprises an intake manifold 1 supplied with a combustion mixture through a compressor 2 which itself draws the combustible mixture from a carburettor 3. The quantity of mixture admitted to the engine is regulated by the throttle valve 4$^1$ of the carburettor 3 and by a second throttle valve 42.

The throttle valve 4$^1$ is controlled by the pilot's lever 5 through the intermediary of the rod 15¹ and the lever 8¹. In the figure the throttle valve 4¹ has been illustrated in its wide open position, the lever 5 being in contact with the stop 18.

The throttle valve 4² is controlled by the power member of the relay device of the boost control 7 through the intermediary of the lever 8². The detail of the boost control 7 is illustrated in Fig. 2. The boost control 7 comprises a chamber 19 which communicates by a conduit 20 with the admission intake manifold 1 at the discharge side of the compressor 2 (Fig. 9). The induction pressure is then transmitted to the chamber 19. If the compressor 2 is cut out or if it has been disposed between the throttle valves 4¹ and 4², or posterior to the throttle valve 4¹, the pipe 20 should open into the intake manifold posterior to the valve 4². The throttle valve 4² itself can besides be placed anterior to the throttle valve 4¹, instead of being placed posterior to said throttle valve, as has been illustrated in Figure 9.

The operation of the device is as follows:

Assuming the engine functions at a definite height, the pilot's lever 5 being in contact with the abutment 18 and the throttle valve 4¹ being wide open, the various members of the boost control and the throttle valve 4² occupy a position of equilibrium as long as the conditions of running the motor do not vary; the throttle valve 4² is partially closed as long as the altitude is less than the rated altitude. This position is illustrated in Figs. 9 and 2. The pilot plunger 34 occupies the inoperative position, the induction pressure is equal to the rated induction pressure corresponding to the particular position occupied by the lever 43, and the element 21 has a length $l$.

If the pilot moves the lever 5 in the direction of the arrow 17, in such a way as partially to close the throttle valve 4¹, this partial closure produces a lowering of the induction pressure existing in the intake manifold 1, and the relay device is put into action as previously described. This movement of the relay device is transmitted to the throttle valve 4² by the lever 8², and this throttle valve, which was partially closed, reopens and brings about an increase in the induction pressure. The corresponding induction pressure is equal to the rated pressure which corresponds to the new position of the power member 6 and is less than the initial rated pressure. When this new rated pressure is obtained the throttle valve 4² is wider open than initially, whereas the throttle valve 4¹ is more closed than initially. The plunger 34 then occupies the inoperative position, the relay device is out of action, the power piston 29 comes to rest, and the system is again in equilibrium.

The induction pressure in the manifold 1 is equal to the new value of the rated pressure and in consequence less than the initial induction pressure. The quantity of air or mixture admitted to the engine is itself less than the initial quantity of air or mixture. It can thus be seen that the movement of the lever 5 in the direction of closing of the throttle valve 4¹ has as a result a lessening of the quantity of air or mixture admitted to the engine. The arrangement described in Fig. 9, in which the lever 5 and the boost control 7 control two different throttle valves, therefore obtain progressiveness of the regulation of the quantity of air or mixture during the movement of the pilot's lever 5 in the closing direction and in the same manner as the device described with reference to Fig. 1.

When the engine functions at ground level the lever 5 is placed in the position of maximum throttle opening, that is to say, in contact with the abutment 18, the power piston 29 and the power member 6 occupy a predetermined position, the throttle valve 4² being partially closed and the engine develops the maximum power allowed. If the engine is brought to an altitude, the lever 5 being maintained in the position of maximum opening, the power piston 29 rises in the cylinder 28 and takes with it the power member 6. In the course of this displacement, it opens the throttle valve 4² more and more, while it diminishes the datum of the boost control progressively.

The induction pressure which remains constantly equal to the rated induction pressure at each instant, diminishes itself. When the altitude reaches the rated altitude, the power piston abuts against the upper end of the cylinder 28 and the throttle valve 4² then reaches its total opening. The device illustrated in Fig. 9 therefore brings about a decrease in the induction pressure and, consequently in the maximum quantity of air or mixture admitted to the engine when the height increases, in the same manner as the device illustrated in Fig. 1.

Figures 10, 11:
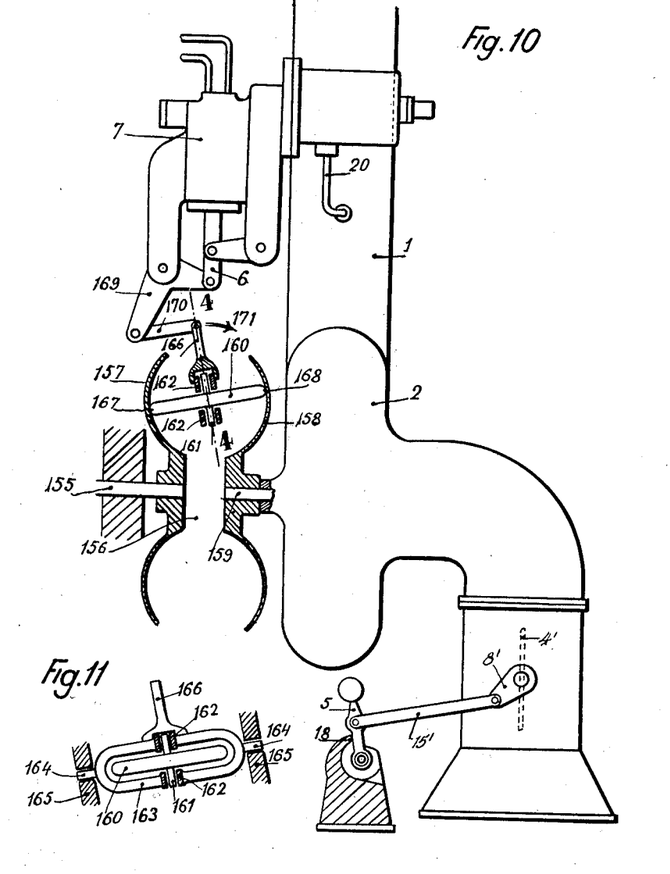
Fig. 10 illustrates schematically, in partial sectional elevation, another form of construction of the invention in which the boost control controls a device for regulating the speed of a compressor disposed in the intake manifold of the engine.
Fig. 11 illustrates a section along 4—4 of a detail of the device illustrated in Fig. 3.

In the device illustrated in Fig. 10, the compressor 2 is operated by a shaft 155 through the intermediary of a variable gear coupling, indicated generally by the reference numeral 56. The shaft 155 is either the shaft of the engine or a shaft driven thereby. The variable coupling 156 comprises two discs, having annular depressions 157 and 158. The disc 157 is driven by the driving shaft 155, while the disc 158 drives the shaft 159 of the compressor. The driving of the disc 158 by the disc 157 takes place through the intermediary of one or several rollers 160. The spindle 161 of the roller 160 pivots in bearings 162 carried by the frame 163 (Fig. 11). The frame 163 carries at its ends pins 164 turning in fixed bearings 165. The movement of the frame 163 is effected by means of a lever 166 whereby it is possible to modify the position of the roller 160 in relation to the discs 157—158 and thus alter the ratio of the diameters of the circles of contact 167 and 168 between the roller 160 and the discs 157 and 158. The arrangement therefore modifies the ratio of the step up of the coupling 156.

The coupling which is known in itself, has been illustrated in a schematic manner only, and in particular the arrangements which assure the friction between the roller 160 and the discs 157 and 158, in order to avoid an excessive slip between the various members have not been indicated.

The lever 166 is controlled by the power member 6 of the relay device of the boost control by the intermediary of a bell crank 169 and the rod 170. When several rollers 160 are spread around the circumference of the coupling they are simultaneously controlled by the power member 6. When the power member 6 is displaced upwards the lever 166 and the roller 160 turn in the direction of the arrow 171, and the step up of the coupling increases. The speed of the compressor therefore increases (for a given speed of the engine), and this increase in the speed produces an increase in the quantity of air or mixture admitted to the engine and an increase in the delivery pressure of the compressor, that is to say of the induction pressure existing in the intake manifold 1. Finally, the control of the speed of the compressor by the power member 6 of the relay device of the boost control has exactly the same effect as the control of the throttle valve $4^2$ by the power member in the arrangement illustrated in Fig. 9.

Thus it is to be understood that the functioning of the device illustrated in Fig. 10 is absolutely analogous to the device illustrated in Fig. 9. In the one and in the other case the movement of the pilot's lever 5 in a direction to close the throttle valve brings about an actual and progressive decrease, without lost motion, of the quantity of air or mixture admitted to the engine, and the maximum induction pressure which corresponds to the full open position of the lever 5 diminishes when the altitude increases. The functioning would be the same if the arrangement controlled by the power member 6 of the relay device of the boost control comprises any other device for regulating the quantity of air or mixture admitted to the engine.

Figure 12:
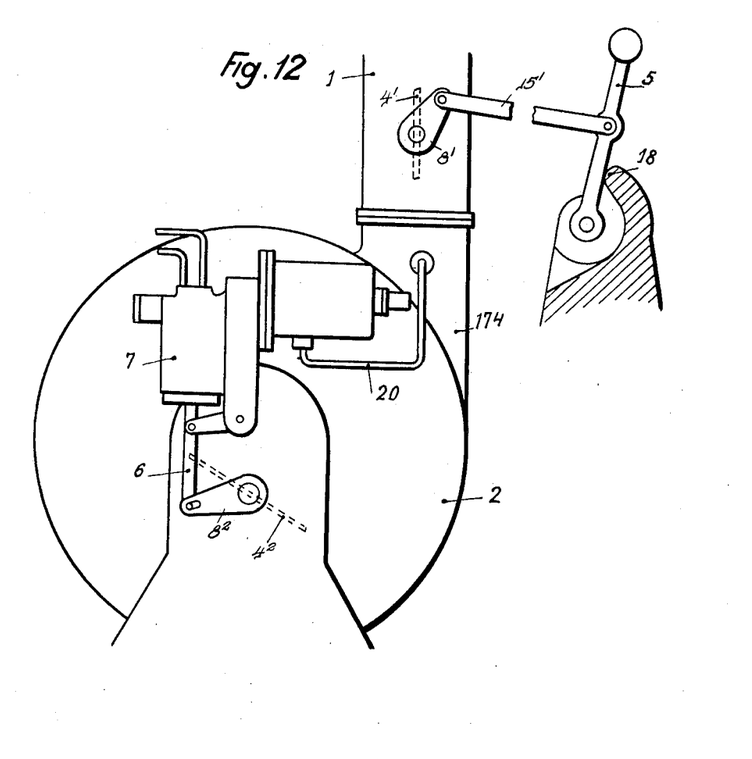
Fig. 12 illustrates schematically, in elevation, a method of carrying out the invention, in which the chamber of the boost control which contains the manometric element is connected to the intake manifold between the regulating device controlled by the boost control and the throttle valve controlled by the pilot.

In the device illustrated in Fig. 12 the throttle valve $4^1$ controlled by the pilot's lever 5 is disposed on the delivery side of the compressor 2. The throttle valve $4^2$ controlled by the power member 6 of the boost control 7 is disposed at the entry side of the compressor. The valve $4^2$ could, however, be disposed at the delivery side of the compressor anterior to the throttle valve $4^1$. The compressor 2 could be cut out if desired. The conduit 20, which connects the chamber 19 of the boost control to the intake manifold 1, opens into the latter at the point 174 between the compressor 2 and the throttle valve $4^1$. If the throttle valve $4^2$ was disposed at the exit of the compressor 2, or if the compressor is cut out, the pipe 20 would open into the intake manifold between the two throttle valves $4^2$ and $4^1$.

In such an arrangement, the regulation, by the pilot's lever 5, of the quantity of air or mixture admitted to the engine is always progressive and without lost motion, even if the boost control is not a boost control with a variable datum. In such a case in fact the control of the throttle valve $4^1$ by the boost control has for effect the maintenance of a constant pressure in the region 174 of the manifold 1. Any modification of the opening of the throttle valve $4^1$ by the lever 5 of the pilot will obviously produce a variation in the induction pressure on the delivery side of this valve. The maximum induction pressure which corresponds to the widest opening of the valve $4^1$ would, therefore, be invariable and equal to the constant pressure maintained by the functioning of the boost control in the region 174 of the manifold 1.

The boost control which is the subject of the invention, applied to such an arrangement, makes it possible to vary the maximum induction pressure as a function of the altitude. The lever 5 being maintained in contact with the abutment 18 and the throttle valve $4^1$ being wide open, an increase in the altitude brings about first of all a lowering of the pressure in the intake manifold and, in particular, in the region 174 of this manifold. This lowering of the pressure puts into action the relay device of the boost control; the power member 6 moves upwards and increases the opening of the throttle valve $4^2$.

This increase in the opening produces an increase in the pressure in the region 174 of the manifold 1 and the valve $4^2$ stabilises itself when the rated induction pressure is re-established in the region 174; this equilibrium pressure is obtained for a position of the power member 6 different to the initial position thereof, and in consequence the induction pressure in the region 174 has a different value from its initial value, since, owing to the connection between the power member 6 and the device for varying the datum of the boost control, the movement of the power member 6 brings about a variation in the rated induction pressure. In the device illustrated in Fig. 12, the maximum induction pressure is therefore easily variable as a function of the altitude.

In the arrangement illustrated in Fig. 12, it is clear that the power member 6 of the relay device could control a device for the variation of the speed of the compressor 2, such as that which has been illustrated in Fig. 10, instead of controlling a throttle valve. This power member could similarly control any other device for regulating the quantity of air or mixture admitted to the engine.

If the connection between the power member 6 and the device for varying the datum of the boost control is carried out as has been illustrated in Fig. 2, the maximum induction pressure decreases as the altitude increases. But as has been pointed out in certain engines this connection may be altered in such a way that the maximum induction pressure increases as the altitude increases, or even in such a way that it varies according to a predetermined law increasing at certain altitudes and decreasing at other altitudes. It must be noted that in reality, the maximum induction pressure does not vary directly as a function of the altitude, that is to say the atmospheric pressure, but it varies directly as a function of the pressure in the region 174 of the manifold, a pressure which is in itself a function of the altitude and the speed of the engine.

Figure 13:
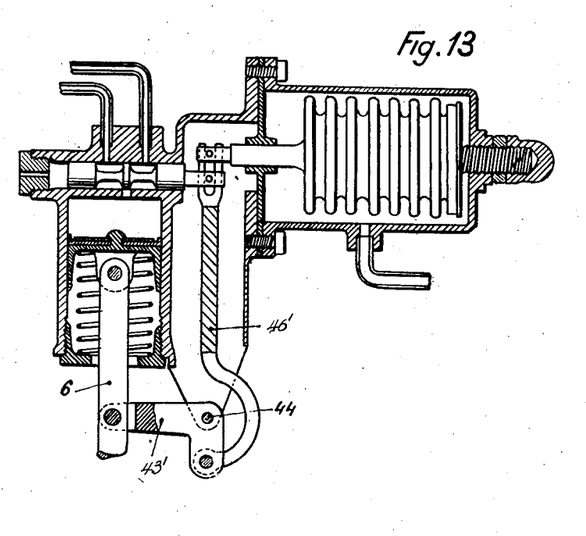
Figs. 13 and 14 illustrate, in longitudinal section, variations in the construction of the boost control illustrated in Fig. 2.

In Fig. 13 a further modification of the boost control illustrated in Fig. 2 has been illustrated, in which a movement of the power member 6 upwards brings about an increase in the rated induction pressure, instead of bringing about a decrease of the latter, as in the device illustrated in Fig. 2. This result is obtained by a simple modification of the form of the lever 43 and the fork 46, the lever and fork being replaced respectively by a lever $43^1$ and a fork $46^1$. It can be seen clearly, according to Fig. 13 that a movement of the fork $46^1$ which corresponds to a determined movement of the lever $43^1$, is in the opposite direction to the movement of the fork 46 (Fig. 2), which corresponds to the same movement of the lever 43. If the boost control illustrated in Fig. 13 is substituted for the boost control illustrated in Fig. 2 in the device illustrated in Fig. 12, the maximum induction pressure increases, instead of decreasing, when the altitude increases.

Figure 14:
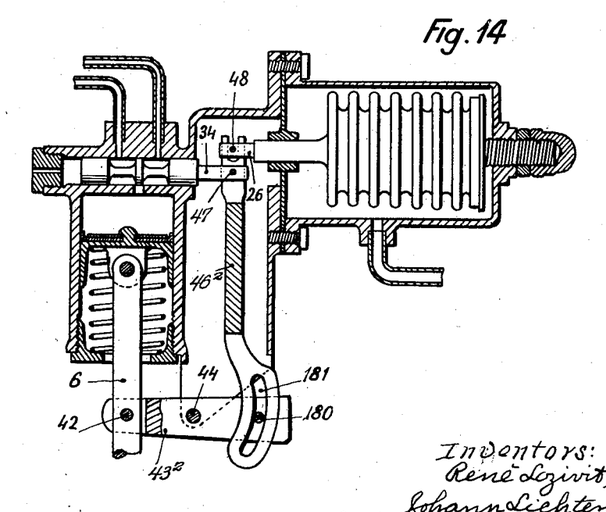

In Fig. 14 a variant of the boost control illustrated in Fig. 2 has been illustrated, which allows the datum of the boost control to vary as a function of the position of the power member 6 of the relay device of the boost control according to an arbitrary law. In this device, the fork $46^2$ is pivoted about a pin 47 carried by the plunger 34. The stud 48 carried by the spindle 26 of the element 21 engages in the end of this fork. A lever $43^2$ pivoted upon a pin 44 and replacing the lever 43 of the device illustrated in Fig. 2 is connected to the power member 6 by the pin 42. The lever $43^2$ carries a stud 180 which engages in a slot 181 carried by the end of the fork $46^2$. By giving a suitable form to the slot 181 a definite variation of the datum of the boost control as a function of the displacement of the power member 6 can be obtained.

Of course, in the devices illustrated in Figs. 9, 10 and 12, the boost control shown in Fig. 2 may be replaced by any other boost control previously described.

It will easily be seen, in the various boost controls illustrated, how it should be possible to invert the direction of the variation of the datum of the boost control as a function of the displacements of the power member of the relay device. In the devices illustrated in Figs. 3, 4, 5 or 8, the lever 43 could be given an analogous modification to that which has been illustrated in Fig. 13. In the device illustrated in Fig. 3, the helicoidal collar 50, the step of which is to the right, could also be replaced by a helicoidal collar with a step to the left. In the device illustrated in Fig. 8, it is also possible to modify the profile of the needle 88, this needle growing narrower towards the top, instead of growing wider. In the device illustrated in Fig. 6 for example, the pressure existing in the chamber 80 is caused to act on the right end of the plunger 34, instead of making it act on the left end as has been illustrated.

In order to alter the direction of the variation of the maximum induction pressure as a function of the altitude, it is likewise possible, in a general manner to invert the direction of the movement of the power member of the relay device and at the same time to invert the direction of the movement of the member regulating the quantity of air or of mixture admitted to the engine controlled by the said power member, without modifying the connection between the power member of the arrangement for varying the datum of the boost control. In the device illustrated in Figs. 9 and 2, for example, the pipe for the oil under pressure 35 and the oil discharge pipe 38 would be interchanged. In this way, a lowering of the pressure in the chamber 19 would bring about a movement downwards of the piston 29, instead of a movement upwards. At the same time the direction of opening of the throttle valve 4² controlled by the power member 6 will be inverted by turning this valve 4² through 90 degrees for example compared with the control lever 8². The connection between the power member 6 and the fork 46 by the lever 43 remaining unaltered, a movement upwards of the piston 29 will also bring about a decrease in the rated induction pressure, but this movement then corresponds to a closure of the throttle valve 4², that is to say a diminution of the quantity of air or mixture admitted to the engine, instead of corresponding to an increase in the latter, as in the device illustrated in Figs. 9 and 2. An analogous modification in all the other forms of construction of the boost control or of its applications illustrated will lead to the same result.

It must also be pointed out with reference to the direction of the variation of the datum of the boost control as a function of the displacements of the power member of the relay device, that the boost controls with relay devices often have a tendency to throb, that is to say to keep up a periodic oscillation round a point of equilibrium. This throbbing or oscillation is obviously harmful, since it prevents even running of the engine. By connecting the power member of the relay device to the device for varying the datum of the boost control in such a way that a movement of the said power member in a direction to increase the quantity of air or mixture admitted to the engine will bring about a decrease in the rated induction pressure, will improve the functioning of the boost control in the sense that it reduces the possibilities of pulsation or throbbing of the latter. The devices which form the subject of the invention could be used, in certain cases, for the sole object of suppressing or reducing the harmful throbbings of the boost control.

On the contrary, if the connection between the power member and the device for varying the datum of the boost control is carried out in such a way that a movement of the said power member in a direction to increase the quantity of air or mixture admitted to the engine will bring about an increase in the rated induction pressure, this connection is favourable to throbbing and tends to increase the effect. Harmful throbbings will therefore be avoided by decreasing the speed of displacement of the power member when the relay device is in action. In the arrangement illustrated in Fig. 2 for example the section of the orifice 32 will be reduced. Under these conditions, the throbbings could be suppressed, but the relay device will take longer to reach a position of equilibrium.

As has been pointed out, it is necessary, in the greater number of cases, to diminish the maximum induction pressure when the altitude increases, which renders it necessary to use the first method of connection, that is to say the method of connection which favours the suppression of the throbbing and obtains the benefit of the two possible advantages of the invention, namely the variation of the maximum induction pressure as a function of the altitude and the suppression of the throbbing of the boost control.

In the devices illustrated in the annexed drawings, the pilot's lever controls a throttle valve disposed in the intake manifold, but it is clear that this lever, as also the power member of the boost control, could control any other device for regulating the quantity of air or mixture admitted to the engine, as for example, a compressor having a variable speed.

In the present application, the carburetor has been illustrated in a very schematic manner and the fuel feed has not been illustrated. The fuel feed and the point in the manifold where introduction of the fuel takes place matters little as regards the present invention. In the arrangement illustrated in Fig. 9 for example the fuel can be introduced on the intake side of the valve 4¹, between the valves 4¹ and 4², on the discharge side of the valve 4² or on the discharge side of the compressor 2, or it can even be injected directly into the cylinders of the engine. The presence of fuel in the air sucked in, does not in fact effect the functioning of the devices described, and the fact that the fluid the delivery of which is regulated is pure air or a mixture of fuel is immaterial.

In all the devices which have been described by way of example, it has been assumed that the fluid force used in the relay device is the lubricating oil which is under the pressure. This fluid force could be the compressed mixture (or compressed air) issuing from the compressor associated with the engine, without necessitating modifications in the apparatus except, however, in the dimensions of the various members. The supply pipe 35 of the oil under pressure will then be attached to the discharge of the compressor, while the discharge pipe 38 will be attached to the inlet of the compressor.

In all the devices described, with the exception of the device illustrated in Fig. 3, in which the relay device necessarily employs fluid under pressure, the type of relay device described could be replaced by any relay device, conditional on replacing respectively the pilot plunger 34 and the power member 6 illustrated by pilot members and power members of the relay device of any kind.

Finally it must be noted that the essential of the invention resides in a disposition which is internal to the boost control unit, namely an operative conection between the power member, the relay device and the means for varying the datum of the boost control. The mechanical arrangement by which the movements of the power member of the relay device superimpose themselves upon the movements of the control lever of the pilot to produce the resultant movement of the throttle valve does therefore not affect the carrying into effect of the invention. The arrangements which, in the examples described bring about this combined control could be replaced by any other equivalent device. For example it would be possible, in order to realise this combined control, to utilise the arrangement of pivoted levers described in the specification of British Patent No. 291,152 or the differential gearing device described in the specification of British Patent No. 356,619.

What we claim and desire to secure by Letters Patent is:

1. A variable datum boost control with a relay device having a pilot member and a power member, for an internal combustion engine having an induction manifold and a control device therein, operatively connected with the boost control power member, for controlling the amount of air or mixture supplied to the engine, which comprises, in combination, a chamber, a passage for connecting said chamber with said induction manifold posterior to said control device, a manometric element in said chamber, an operative connection between said manometric element and said pilot member, means for imparting a load on said manometric element, and means responsive to said power member for varying the load on said manometric element.

2. A variable datum boost control with a relay device having a pilot member and a power member, for an internal combustion engine having an induction manifold and a control device therein, operatively connected with the boost control power member, for controlling the amount of air or mixture supplied to the engine, which comprises, in combination, a chamber, a passage for connecting said chamber with said induction manifold posterior to said control device, a manometric element in said chamber, an operative connection between said manometric element and said pilot member, a spring for loading said manometric element, and means operative by said power member for varying the pressure exerted by said spring on said manometric element.

3. In connection with an internal combustion engine having an induction manifold and a throttle valve therein, a throttle control, which comprises, in combination, a pilot's lever, an operative connection between said pilot's lever and said throttle valve, a chamber, a passage for connecting said chamber with said induction manifold posterior to said throttle valve, a manometric element in said chamber, a relay device having a pilot member and a power member, an operative connection between said manometric element and said pilot member, means for imparting a load on said manometric element, means responsive to said power member for varying the load on said monometric element, and means operative by said power member for altering the connection between said pilot's lever and said throttle valve.

4. In connection with an internal combustion engine having an induction manifold and a throttle valve therein, a throttle control, which comprises, in combination, a pilot's lever, an operative connection between said pilot's lever and said throttle valve, a chamber, a passage for connecting said chamber with said induction manifold posterior to said throttle valve, a manometric element in said chamber, a relay device having a pilot member and a power member, an operative connection between said manometric element and said pilot member, a spring for loading said manometric element, means operative by said power member for varying the pressure exerted by said spring on said manometric element, and means operative by said power member for altering the connection between said pilot's lever and said throttle valve.

5. In connection with an internal combustion engine having an induction manifold and a throttle valve therein, a throttle control which comprises, in combination, a pilot's lever, an operative connection between said pilot's lever and said throttle valve, a variable datum boost control responsive to the pressure in said manifold posterior to said throttle valve, a relay device in said boost control, a power member in said relay device, means operative by said power member for altering the connection between said pilot's lever and said throttle valve, and means operative by said power member for lowering the rated induction pressure as said power member moves in the direction of opening said throttle valve.

6. In connection with an internal combustion engine having an induction manifold and a throttle valve therein, a throttle control which comprises, in combination, a pilot's lever, an operative connection between said pilot's lever and said throttle valve, a variable datum boost control, a chamber in said boost control, a passage for connecting said chamber with said manifold posterior to said throttle valve, a manometric element in said chamber, a relay device having a pilot member and a power member, an operative connection between said manometric element and said pilot member, means operative by said power member for altering the connection between said pilot's lever and said throttle valve, and means operative by said power member for lowering the rated induction pressure as said power member moves in the direction of opening said throttle valve.

7. In connection with an internal combustion engine having an induction manifold and a throttle valve therein, a throttle control which comprises, in combination, a pilot's lever, an operative connection between said pilot's lever and said throttle valve, a variable datum boost control, a chamber in said boost control, a passage for connecting said chamber with said manifold posterior to said throttle valve, a manometric element in said chamber, a relay device having a pilot member and a power member, an operative connection between said manometric element and said pilot member, means operative by said power member for altering the connection between said pilot's lever and said throttle valve, and means operative by said power member for increasing the length of said manometric element which corresponds to the inoperative position of said pilot member, as said power member moves in the direction of opening said throttle valve.

8. In connection with an internal combustion engine having an induction manifold and a throttle valve therein, a throttle control which comprises, in combination, a pilot's lever, an operative connection between said pilot's lever and said throttle valve, a variable datum boost control, a chamber in said boost control, a passage for connecting said chamber with said manifold posterior to said throttle valve, a manometric element in said chamber, a relay device having a pilot member and a power member, means operative by said power member for altering the connection between said pilot's lever and said throttle valve, a floating lever, and operative connections from three different points of said floating lever respectively to said manometric element, said pilot member, and said power member, said last mentioned operative connections being so designed that the length of said manometric element which corresponds to the inoperative position of said pilot member increases as said power member moves in the direction of opening said throttle valve.

9. In connection with an internal combustion engine having an induction manifold and a throttle valve therein, a throttle control which comprises, in combination, a pilot's lever, an operative connection between said pilot's lever and said throttle valve, a variable datum boost control, a chamber in said boost control, a passage for connecting said chamber with said manifold posterior to said throttle valve, a manometric element in said chamber, a relay device having a pilot member and a power member, an operative connection between said manometric element and said pilot member, means operative by said power member for altering the connection between said pilot's lever and said throttle valve, means for imparting a load on said manometric element, and means operative by said power member for increasing the load on said manometric element as said power member moves in the direction of opening said throttle valve.

10. In connection with an internal combustion engine having an induction manifold and a throttle valve therein, a throttle control which comprises, in combination, a pilot's lever, an operative connection between said pilot's lever and said throttle valve, a variable datum boost control, a chamber in said boost control, a passage for connecting said chamber with said manifold posterior to said throttle valve, a manometric element in said chamber, a relay device having a pilot member and a power member, an operative connection between said manometric element and said pilot member, means operative by said power member for altering the connection between said pilot's lever and said throttle valve, a spring for loading said manometric element, and means operative by said power member for increasing the strength of said spring as said power member moves in the direction of opening said throttle valve.

11. In connection with an internal combustion engine having an induction manifold, a supercharger in said manifold and a throttle valve anterior to said supercharger, a throttle control which comprises, in combination, a pilot's lever, an operative connection between said pilot's lever and said throttle valve, a variable datum boost control, a chamber in said boost control, a manometric element in said chamber, a first passage for connecting said chamber with said manifold posterior to said supercharger, a second passage for connecting said chamber with said manifold between said throttle valve and said supercharger, a relay device having a pilot member and a power member, an operative connection between said manometric element and said pilot member, means operative by said power member for altering the connection between said pilot's lever and said throttle valve, and means operative by said power member for increasing the ratio between the cross sectional areas of said first and second passages as said power member moves in the direction of opening said throttle valve.

12. In connection with an internal combustion engine having an induction manifold, a device for controlling the amount of air or mixture supplied to the engine which comprises, in combination, a throttle valve in said manifold, a pilot's lever, an operative connection between said pilot's lever and said throttle valve, a variable datum boost control responsive to the pressure in said manifold, a relay device in said boost control, a power member in said relay device, means operative by said power member for varying the amount of air or mixture supplied to the engine through said manifold, and means operative by said power member for lowering the rated induction pressure as said power member moves in the direction of increasing the amount of air or mixture supplied to the engine.

13. In connection with an internal combustion engine having an induction manifold, a device for controlling the amount of air or mixture supplied to the engine, which comprises, in combination, a throttle valve in said manifold, a pilot's lever, an operative connection between said pilot's lever and said throttle valve, a variable datum boost control, a chamber in said boost control, a passage for connecting said chamber with said manifold, a manometric element in said chamber, a relay device having a pilot member and a power member, an operative connection between said manometric element and said pilot member, means operative by said power member for varying the amount of air or mixture supplied to the engine through said manifold, and means operative by said power member for lowering the rated induction pressure as said power member moves in the direction of increasing the amount of air or mixture supplied to the engine.

14. In connection with an internal combustion engine having an induction manifold, a device for controlling the amount of air or mixture supplied to the engine, which comprises, in combination, a throttle valve in said manifold, a pilot's lever, an operative connection between said pilot's lever and said throttle valve, a variable datum boost control, a chamber in said boost control, a passage for connecting said chamber with said manifold, a manometric element in said chamber, a relay device having a pilot member and a power member, an operative connection between said manometric element and said pilot member, means operative by said power member for varying the amount of air or mixture supplied to the engine through said manifold, and means operative by said power member for increasing the length of said manometric element which corresponds to the inoperative position of said pilot member, as said power member moves in the direction of increasing the amount of air or mixture supplied to the engine.

15. In connection with an internal combustion engine having an induction manifold, a device for controlling the amount of air or mixture supplied to the engine, which comprises, in combination, a throttle valve in said manifold, a pilot's lever, an operative connection between said pilot's lever and said throttle valve, a variable datum boost control, a chamber in said boost control, a passage for connecting said chamber with said manifold, a manometric element in said chamber, a relay device having a pilot member and a power member, means operative by said power member for varying the amount of air or mixture supplied to the engine through said manifold, a floating lever, and operative connections from three different points of said floating lever respectively to said manometric element, said pilot member, and said power member, said last mentioned operative connections being so designed that the length of said manometric element which corresponds to the inoperative position of said pilot member increases as said power member moves in the direction of increasing the amount of air or mixture supplied to the engine.

16. In connection with an internal combustion engine having an induction manifold, a device for controlling the amount of air or mixture supplied to the engine, which comprises, in combination, a throttle valve in said manifold, a pilot's lever, an operative connection between said pilot's lever and said throttle valve, a variable datum boost control, a chamber in said boost control, a passage for connecting said chamber with said manifold, a manometric element in said chamber, a relay device having a pilot member and a power member, an operative connection between said manometric element and said pilot member, means operative by said power member for varying the amount of air or mixture supplied to the engine through said manifold, means for imparting a load on said manometric element, and means operative by said power member for increasing the load on said manometric element as said power member moves in the direction of increasing the amount of air or mixture supplied to the engine.

17. In connection with an internal combustion engine having an induction manifold, a device for controlling the amount of air or mixture supplied to the engine, which comprises, in combination, a throttle valve in said manifold, a pilot's lever, an operative connection between said pilot's lever and said throttle valve, a variable datum boost control, a chamber in said boost control, a passage for connecting said chamber with said manifold, a manometric element in said chamber, a relay device having a pilot member and a power member, an operative connection between said manometric element and said pilot member, means operative by said power member for varying the amount of air or mixture supplied to the engine through said manifold, a spring for loading said manometric element, and means operative by said power member for increasing the strength of said spring as said power member moves in the direction of increasing the amount of air or mixture supplied to the engine.

RENÉ LOZIVIT.
JOHANN LICHTENSTEIN.
PAUL XAVIER AUGUSTE GISTUCCI.